(12) United States Patent
Scheppers et al.

(10) Patent No.: US 8,593,763 B2
(45) Date of Patent: Nov. 26, 2013

(54) PREVENTING OIL MIGRATION TO SLIDER FLUID BEARING SURFACE

(75) Inventors: Karl Harold Scheppers, Edina, MN (US); Kah-Hoe Tan, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 93 days.

(21) Appl. No.: 13/096,696

(22) Filed: Apr. 28, 2011

(65) Prior Publication Data

US 2012/0275051 A1    Nov. 1, 2012

(51) Int. Cl.
*G11B 21/21*     (2006.01)
*G11B 5/60*     (2006.01)

(52) U.S. Cl.
USPC ........................................... 360/235.7

(58) Field of Classification Search
USPC ........................... 360/235.7, 236.5
See application file for complete search history.

(56) References Cited

U.S. PATENT DOCUMENTS

| | | | |
|---|---|---|---|
| 6,021,020 A * | 2/2000 | Itoh et al. ................ | 360/235.7 |
| 6,040,965 A * | 3/2000 | Terunuma et al. ......... | 360/236.5 |
| 6,188,547 B1 * | 2/2001 | Gui et al. ................ | 360/236.5 |
| 6,198,600 B1 * | 3/2001 | Kitao et al. .............. | 360/236.5 |
| 6,594,113 B2 | 7/2003 | Rao et al. | |
| 7,227,723 B2 | 6/2007 | Nath et al. | |
| 7,450,343 B2 | 11/2008 | Huang | |
| 2005/0157426 A1 * | 7/2005 | Musashi et al. .......... | 360/235.7 |
| 2005/0185342 A1 * | 8/2005 | Tani ...................... | 360/235.6 |
| 2008/0239550 A1 * | 10/2008 | Nagai .................... | 360/235.5 |
| 2009/0059432 A1 * | 3/2009 | Kubotera et al. ......... | 360/236.6 |
| 2009/0273860 A1 * | 11/2009 | Ichihara ................. | 360/235.4 |
| 2010/0103560 A1 * | 4/2010 | Imamura et al. ......... | 360/234.3 |
| 2010/0238592 A1 * | 9/2010 | Mizutani ................ | 360/235.4 |

* cited by examiner

*Primary Examiner* — Craig A. Renner
(74) *Attorney, Agent, or Firm* — Mitchell K. McCarthy; McCarthy Law Group

(57) ABSTRACT

An apparatus and associated method employing a slider having a leading edge opposing a trailing edge. A fluid bearing surface extends between the leading edge and the trailing edge. The fluid bearing surface contactingly engages a fluid stream operably imparted to the fluid bearing surface by a moving member adjacent thereto. A trailing edge pad extends from the fluid bearing surface adjacent the trailing edge. A capillary lubrication trench (CLT) is disposed entirely between a portion of the trailing edge pad and the trailing edge along a direction that is parallel to a longitudinal axis from the leading edge to the trailing edge.

20 Claims, 5 Drawing Sheets

PREVENTING OIL MIGRATION TO SLIDER FLUID BEARING SURFACE

SUMMARY

In some embodiments a slider is provided having a leading edge opposing a trailing edge. A fluid bearing surface extends between the leading edge and the trailing edge. The fluid bearing surface contactingly engages a fluid stream operably imparted to the fluid bearing surface by a moving member adjacent thereto. A trailing edge pad extends from the fluid bearing surface adjacent the trailing edge. A capillary lubrication trench (CLT) is disposed entirely between a portion of the trailing edge pad and the trailing edge along a direction that is parallel to a longitudinal axis from the leading edge to the trailing edge.

In some embodiments a slider is provided having a leading edge opposing a trailing edge, and further having a fluid bearing surface extending therebetween. A trailing edge pad extends from the fluid bearing surface adjacent the trailing edge. A data transfer member is disposed between the trailing edge pad and the trailing edge. A capillary lubrication trench (CLT) penetrates the trailing edge and is disposed entirely between the data transfer member and the trailing edge.

In some embodiments a method is provided that includes steps of obtaining a slider having a trailing edge pad extending from a fluid bearing surface adjacent a trailing edge of the slider, and having a data transfer member disposed between the trailing edge pad and the trailing edge of the pad; moving a data storage medium adjacent the slider to impart a fluid stream against the fluid bearing surface; and capturing oil dispersed by the fluid stream from the fluid bearing surface into a capillary lubrication trench (CLT) that penetrates the trailing edge and retains the captured oil, preventing the captured oil from migrating back to the fluid bearing surface when the moving step is completed.

DETAILED DESCRIPTION

"Clearance settling" is the term generally used here to describe the phenomenon associated with the characteristic delay during disc drive spin up before the head-to-media-spacing (HMS) achieves a steady-state condition. A good number of operational parameters, such as bit error rate, demonstrate performance within acceptable levels of variation only after steady-state HMS is achieved. Industry trends toward increased data storage areal density and miniaturization of the storage device have brought some attributes to the forefront that before could pragmatically be ignored as negligible. For instance, the effect of lubrication migrating from the storage media to the slider can significantly affect the windage (or fluid stream) shear distribution on the slider and, in turn, disadvantageously increase the clearance settling time.

During the settling time it has been observed that the windage shear forces alter the dynamic positioning and thickness of the oil residing on the slider. The oil deposited on the air bearing surface (ABS, also more generally referred to here as "fluid bearing surface") is generally displaced toward the trailing edge of the slider. The displaced oil can also be forced off the fluid bearing surface and accumulate in low pressure zones such as exist immediately downstream of a protuberant feature or on the trailing edge. With elapsed time, as the amount of oil and its thickness on the fluid bearing surface are reduced, concomitant changes in the windage shear distribution result in reducing the HMS until steady state HMS is achieved. Again, the amount of time necessary to achieve the steady state HMS is referred to as the spin up settling time.

However, when the disc stops spinning, such as in a power down or a reduced power event, the displaced oil can migrate back onto the fluid bearing surface in the absence of any opposition from the windage shear distribution to such migration. In that event, the oil must again be forced away from the fluid bearing surface during the next spin up. That means the increased settling time due to oil on the slider fluid bearing surface is a penalty paid during each spin up. The present embodiments solve that problem by preventing the displaced oil from migrating back onto the fluid bearing surface.

Figure 1:
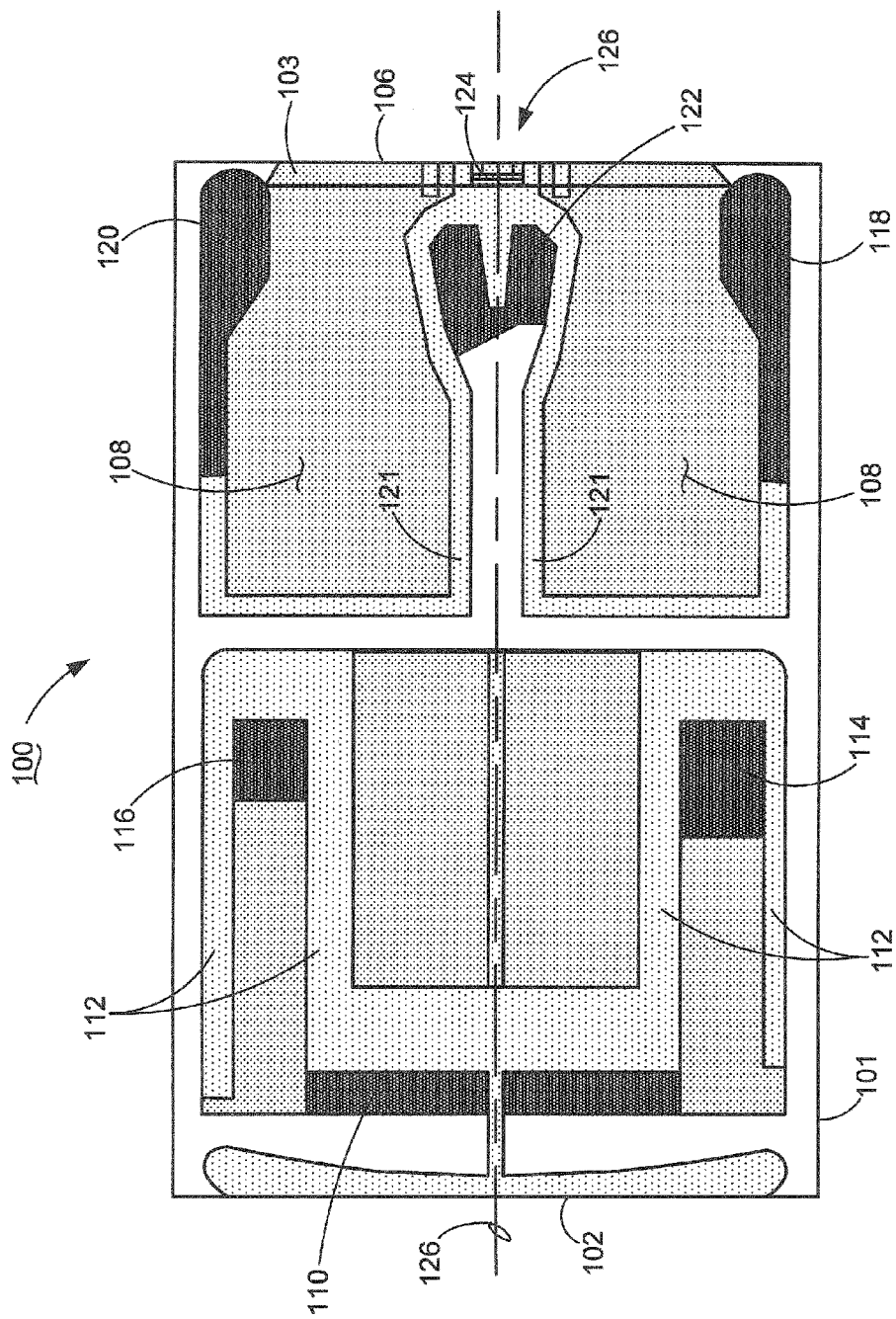
FIG. 1 is a top view diagrammatically depicting a slider that is constructed in accordance with embodiments of the present invention.

FIG. 1 depicts a slider 100 that is constructed in accordance with embodiments of the present invention. The slider 100 has a leading edge 102 with respect to the direction of windage that is generated by the moving media (not shown) adjacent the slider 100 and in a data transfer relationship therewith. The slider 100 also has an opposing trailing edge 106 and a fluid bearing surface 108 extending therebetween. In some cases, such as at a medial data track, the direction of the windage can be substantially parallel to a longitudinal axis 126 of the slider 100 extending between the leading edge 102 and the trailing edge 106. In other cases, such as due to offset at radially inner or outer data tracks, the direction of the windage is angularly across the slider 100, substantially not parallel to its longitudinal axis 126.

In any event, the fluid bearing surface 108 contactingly engages the windage (fluid stream) that is imparted by the moving media. Where air is the environment in which slider 100 and moving media operate, the fluid bearing surface 108 is typically referred to as the air bearing surface (ABS). However, the present embodiments are not so limited to use in only air environments, and so for purposes of this description and meaning of the claims the more general term fluid bearing surface is used to encompass employing the present embodiments in an air environment as well as in other fluidic environments such as but not limited to inert gases (such as helium).

The slider 100 is generally constructed upon a substrate 101 forming the leading edge 102 and a plurality of aerodynamic features for controllably flying the slider 100 at a desired fly height. For instance, a leading end cross rail 110 spans a pair of opposing side rails 112. Nested in each of the side rails 112 is a respective forward landing pad 114, 116. Rear landing pads 118, 120 are opposed across a pair of rails 121 surrounding a center trailing pad (CTP) 122.

An overlayer 103, such as an alumina material, is attached to the substrate 101 defining the trailing edge 106. The overlayer 103 encompasses a data transfer member, such as a transducer 124, between the CTP 122 and the trailing edge 106. A plurality of capillary lubrication trenches (CLTs) 126 in accordance with embodiments of the present invention are disposed entirely between the CTP 122 and the trailing edge 106 in relation to directions parallel to the longitudinal axis 126 of the slider 100.

Figure 2:
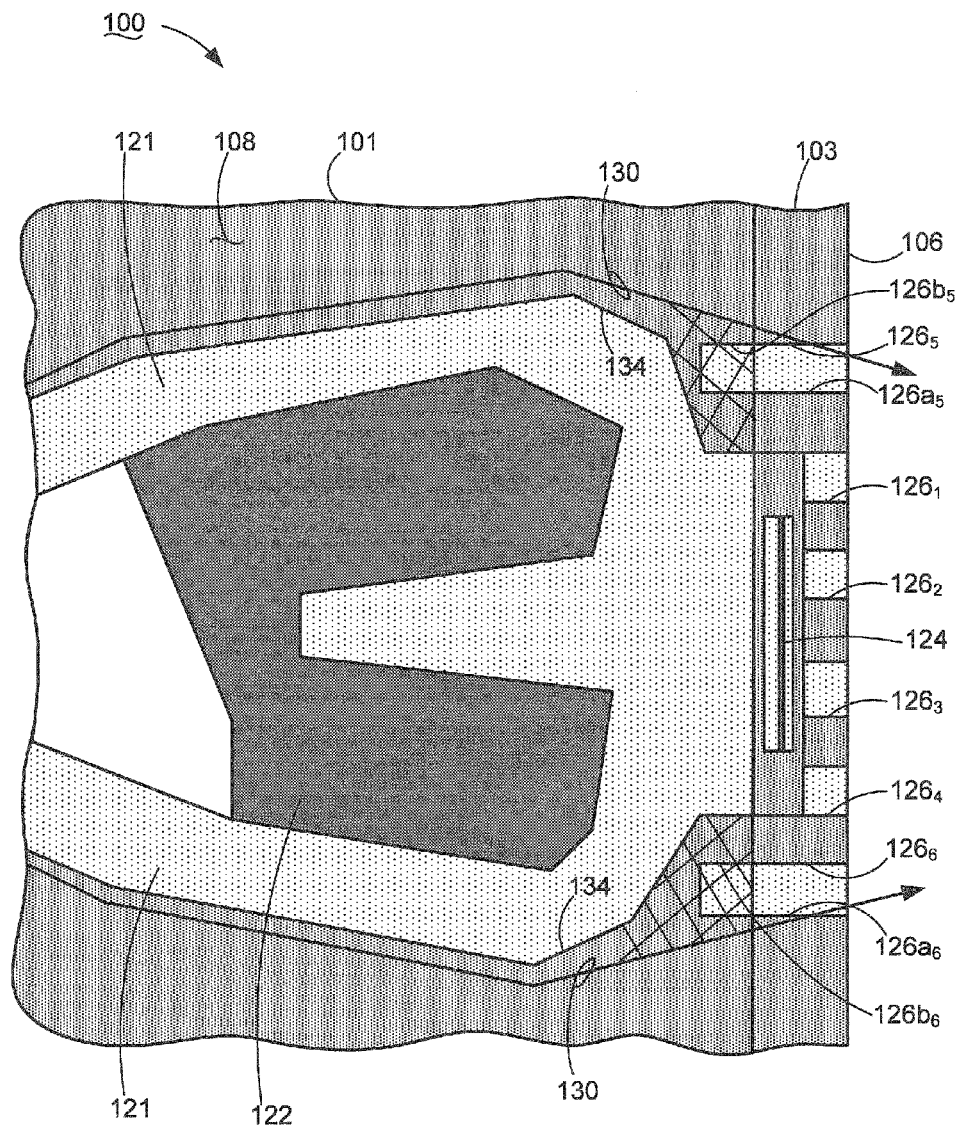
FIG. 2 is a top view diagrammatically depicting an enlarged portion of the slider of FIG. 1.
Figure 4:
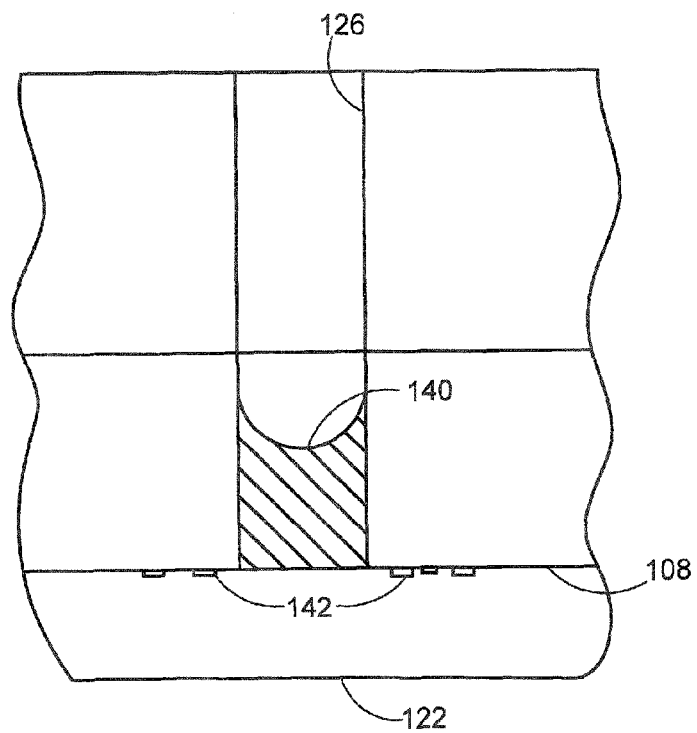
FIG. 4 is an elevational view diagrammatically depicting an enlarged portion of the slider of FIG. 1 in accordance with embodiments of the present invention.
Figure 5:
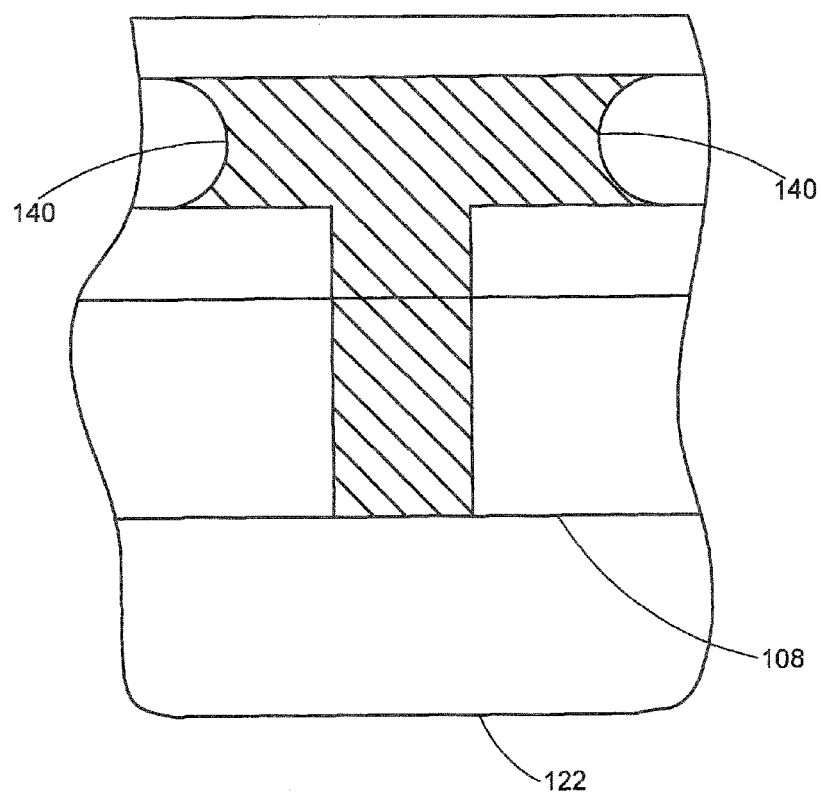
FIG. 5 is an elevational view diagrammatically depicting an enlarged portion of the slider of FIG. 1 in accordance with equivalent alternative embodiments of the present invention.

FIG. 2 is an enlarged portion of the slider 100 of FIG. 1 more clearly depicting illustrative embodiments of the present invention wherein four CLTs $126_1$, $126_2$, $126_3$, $126_4$ penetrate only the overlayer 103, but not so far as to interfere with the functioning of the transducer 124. It will be noted that those CLTs $126_1$, $126_2$, $126_3$, $126_4$ can be characterized by the fact that they extend longitudinally in a direction that is substantially orthogonal to the fluid bearing surface 108, or in other words along a direction into the page in FIG. 2. FIG. 4 discussed below is an elevational depiction that is illustrative of those embodiments. The claimed embodiments are not so limited, however, in that in alternative embodiments one or more of the CLTs 126 can extend longitudinally in a direction that is substantially parallel to the fluid bearing surface 108, or in other words parallel to the page in FIG. 2. FIG. 5 discussed below is an elevational depiction that is illustrative of those embodiments.

Figure 3:
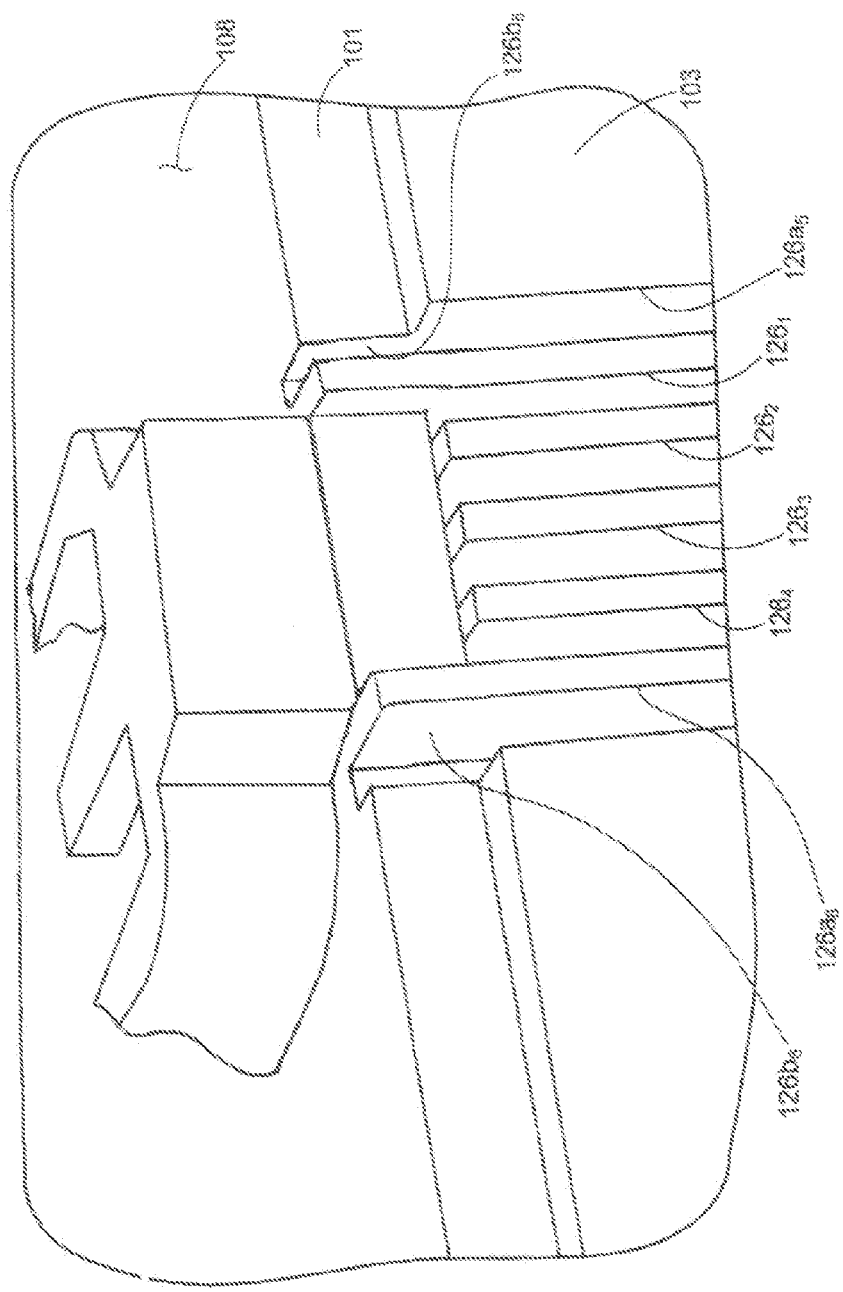
FIG. 3 is an isometric view diagrammatically depicting an enlarged portion of the slider of FIG. 1.

It will be noted that the CLTs $126_1$, $126_2$, $126_3$, $126_4$ are disposed entirely in the overlayer 103, between the transducer 124 and the trailing edge 106. The illustrative embodiments of FIG. 2 also have two CLTs $126_5$, $126_6$ that penetrate both the overlayer 103 and the substrate 101. Particularly, FIGS. 2 and 3 best show a CLT $126a_5$ fully penetrating the overlayer 103, and in fluid communication with a CLT $126b_5$ penetrating the substrate 101. Likewise, a CLT $126a_6$ fully penetrates the overlayer 103, and is in fluid communication with a CLT $126b_6$ penetrating the substrate 101. The CLTs 126 penetrating deeper into the substrate 101 enhance the ability to remove oil from the fluid bearing surface 108.

FIG. 2 diagrammatically depicts, via divided fluid streams represented by reference arrows 130, the operable paths of the windage shear distribution as it passes by the opposing protuberant portions 134 of the rails 121. As depicted, the streams 130 bend toward each other as the result of the relatively low pressure zone immediately downstream of the CTP 122. The low pressure zones outside the fluid bearing surface 108 are cross hatched in FIG. 2 for clarity sake. Importantly, the CLTs $126b_5$, $126b_6$ are closely tucked behind the CTP 122 respectively in each of those low pressure zones so that they are neither formed by some portion of the fluid bearing surface 108 nor do they penetrate the fluid bearing surface 108. In that manner, none of the CLTs 126 alter the fly height characteristics of the slider 100 as are determined by the arrangement of the fluid bearing surface 108 and the various aerodynamic features extending into and out of the fluid bearing surface 108.

The sizes of the CLTs 126 are determined in relation to the characteristic surface tension of the oil on the material from which the CLTs 126 are formed. FIG. 4 depicts an advantageous surface tension relationship whereby a concave oil meniscus 140 creates a capillary force that draws oil droplets 142 from the fluid bearing surface 108 into the CLT 126. CLTs 126 have been successfully employed in accordance with the present embodiments that are about 50 micrometers long and wide, and about 10 micrometers deep. CLTs 126 of that size can straightforwardly be manufactured by ion milling them into the slider 100.

The capillary force advantageously retains the trapped oil in the CLT 126 when the windage shear distribution ends, thereby preventing the oil from migrating back onto the fluid bearing surface 108 during shut down or reduced power events. Providing the CLTs 126 in the windage shear distribution field improves the lube shear map by reducing the incidence of the droplets forming and accumulating in the low pressure zones immediately downstream of protuberant features. Presence of the CLTs 126 increases the lube shear rate around the CTP 122 by increasing the surface area of the fluid bearing surface 108 upon which the windage shear distribution acts during spin up. Importantly, by preventing migration of the oil back to the fluid bearing surface 108 between operating cycles, the CLTs 126 significantly decrease the settling time, resulting in faster and more reliable data transfer operations during spin up.

The present embodiments contemplate a method associated with the apparatus described hereinabove. The method includes obtaining a slider having a trailing edge pad extending from a fluid bearing surface adjacent a trailing edge of the slider, and having a data transfer member disposed between the trailing edge pad and the trailing edge of the pad. The method continues by moving a data storage medium adjacent the slider to impart a fluid stream shear distribution against the fluid bearing surface. The method further continues by capturing oil dispersed by the fluid stream shear distribution from the fluid bearing surface into a capillary lubrication trench (CLT) that penetrates the trailing edge and retains the captured oil, preventing the captured oil from migrating back to the fluid bearing surface when the moving step is completed.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. A slider comprising:
   a leading edge opposing a trailing edge, and a fluid bearing surface extending between the leading edge and the trailing edge that contactingly engages a fluid stream operably imparted to the fluid bearing surface by a moving member adjacent thereto;
   a trailing edge pad extending from the fluid bearing surface operably defining a low pressure zone adjacent a protuberant portion of the trailing edge pad; and
   a capillary lubrication trench (CLT) extending longitudinally in a direction substantially orthogonal to the fluid bearing surface, the CLT intersecting the low pressure zone.

2. The slider of claim 1 comprising another CLT extending longitudinally in a direction substantially parallel to the fluid bearing surface.

3. The slider of claim 1 comprising a substrate and an overlayer attached to the substrate, the substrate defining the leading edge and the overlayer defining the trailing edge, wherein the CLT is defined in the substrate.

4. The slider of claim 2 wherein the overlayer includes a data transfer member.

5. The slider of claim 4 wherein the overlayer comprises alumina.

6. The slider of claim 4 wherein the CLT is a first CLT, the slider comprising a second CLT in the overlayer.

7. The slider of claim 6 wherein the second CLT is between the data transfer member and the trailing edge.

8. The slider of claim 6 comprising two of the first CLTs each intersecting a respective low pressure zone.

9. The slider of claim 8 wherein the second CLT is between the two of the first CLTs.

10. The slider of claim 8 comprising a plurality of the second CLTs between the two of the first CLTs.

11. A slider comprising:
a substrate defining a leading edge, an overlayer connected to the substrate defining a trailing edge, and a fluid bearing surface extending between the leading edge and the trailing edge;
a trailing edge pad extending from the fluid bearing surface operably defining a low pressure zone on the substrate between the trailing edge pad and the trailing edge;
a data transfer member disposed in the overlayer between the trailing edge pad and the trailing edge; and
a capillary lubrication trench (CLT) in the substrate extending longitudinally in a direction substantially orthogonal to the fluid bearing surface, the CLT intersecting the low pressure zone.

12. The slider of claim 11 comprising another CLT extending longitudinally in a direction substantially parallel to the fluid bearing surface.

13. The slider of claim 11 wherein the overlayer comprises alumina.

14. The slider of claim 11 wherein the CLT is as a first CLT, the slider comprising a second CLT defined in the overlayer.

15. The slider of claim 14 wherein the second CLT is defined entirely in the overlayer.

16. The slider of claim 14 wherein the second CLT is defined between the data transfer member and the trailing edge.

17. The slider of claim 14 comprising two of the first CLTs each intersecting a respective low pressure zone.

18. The slider of claim 17 wherein the second CLT is between the two of the first CLTs.

19. The slider of claim 17 comprising a plurality of the second CLTs between the two of the first CLTs.

20. A method comprising:
obtaining a slider having a substrate and an overlayer defining a fluid bearing surface, a trailing edge pad extending from the fluid bearing surface operably defining a low pressure zone between the trailing edge pad and a trailing edge of the slider, the slider further having a capillary lubrication trench (CLT) in the substrate extending longitudinally in a direction substantially orthogonal to the fluid bearing surface, the CLT intersecting the low pressure zone, and the slider further having a data transfer member disposed between the trailing edge pad and the trailing edge of the slider;
moving a data storage medium adjacent the slider to impart a fluid stream against the fluid bearing surface; and
removing oil from the substrate in the low pressure zone by the oil entering into the CLT.

* * * * *